Dec. 31, 1935.  G. A. BURTON  2,025,970
TRANSMISSION HOIST
Filed Sept. 24, 1934  3 Sheets-Sheet 1
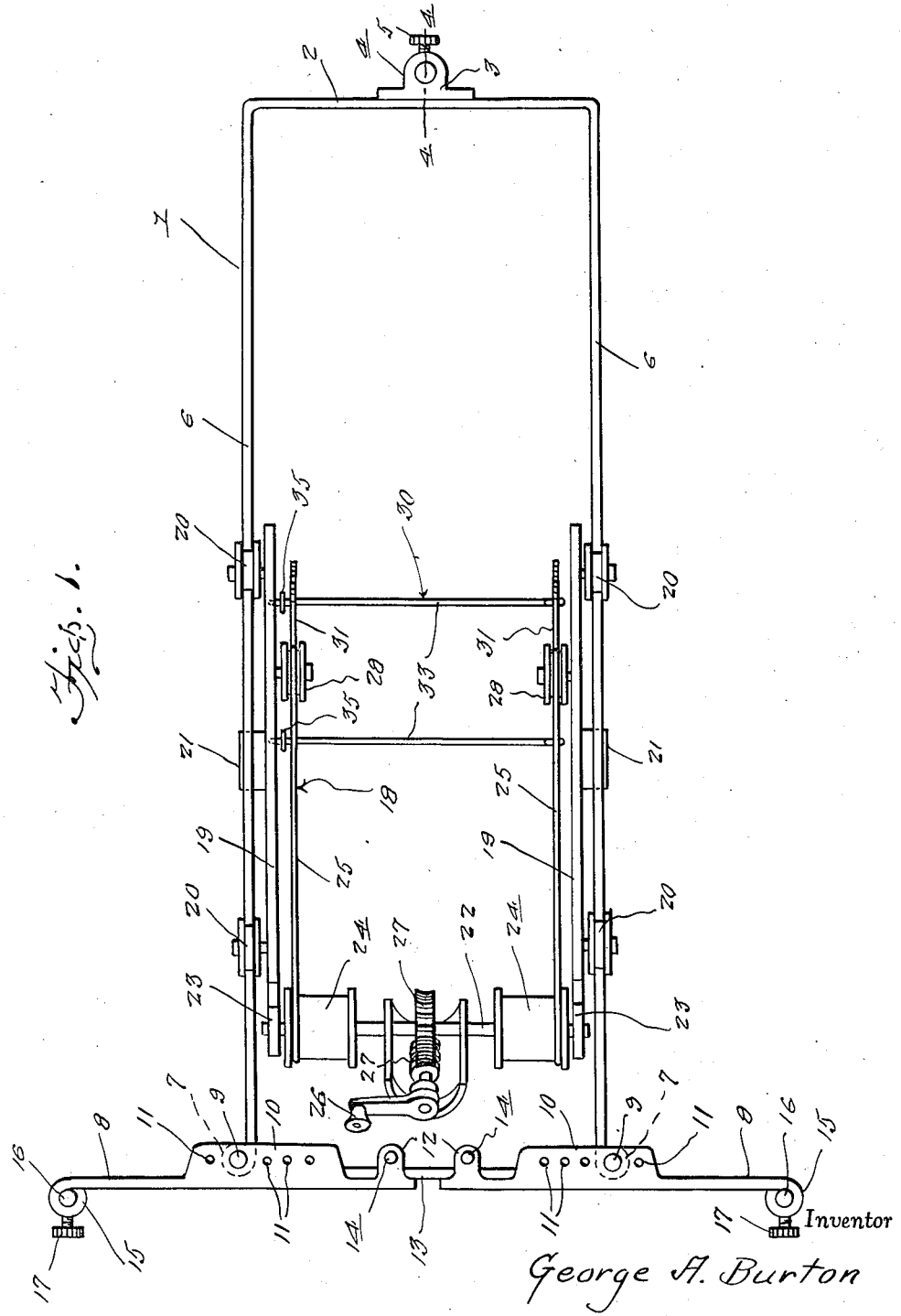
Inventor
George A. Burton
By Clarence A. O'Brien
Attorney Dec. 31, 1935.  G. A. BURTON  2,025,970
TRANSMISSION HOIST
Filed Sept. 24, 1934   3 Sheets-Sheet 2
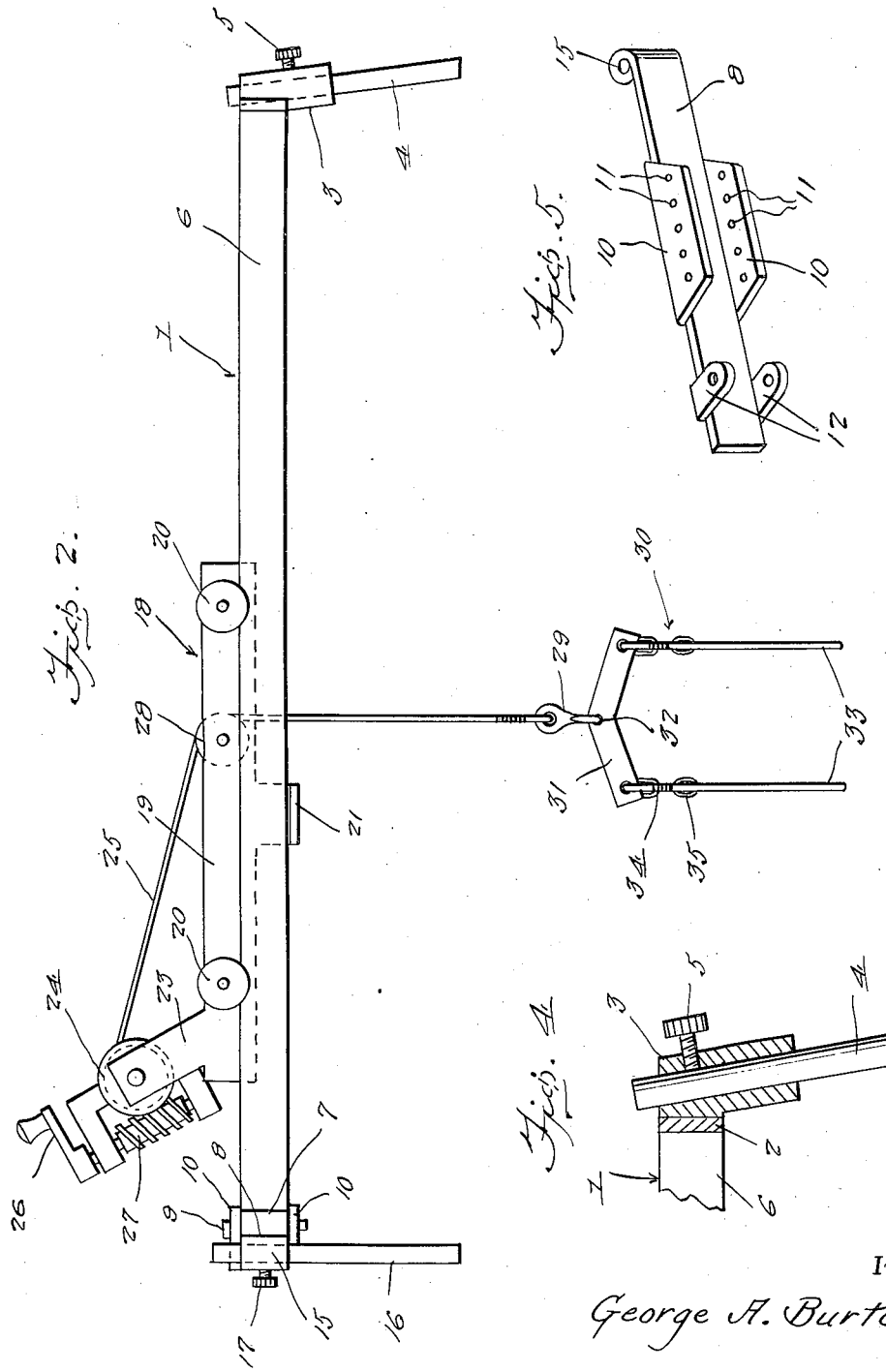
Inventor
George A. Burton
By Clarence A. O'Brien
Attorney

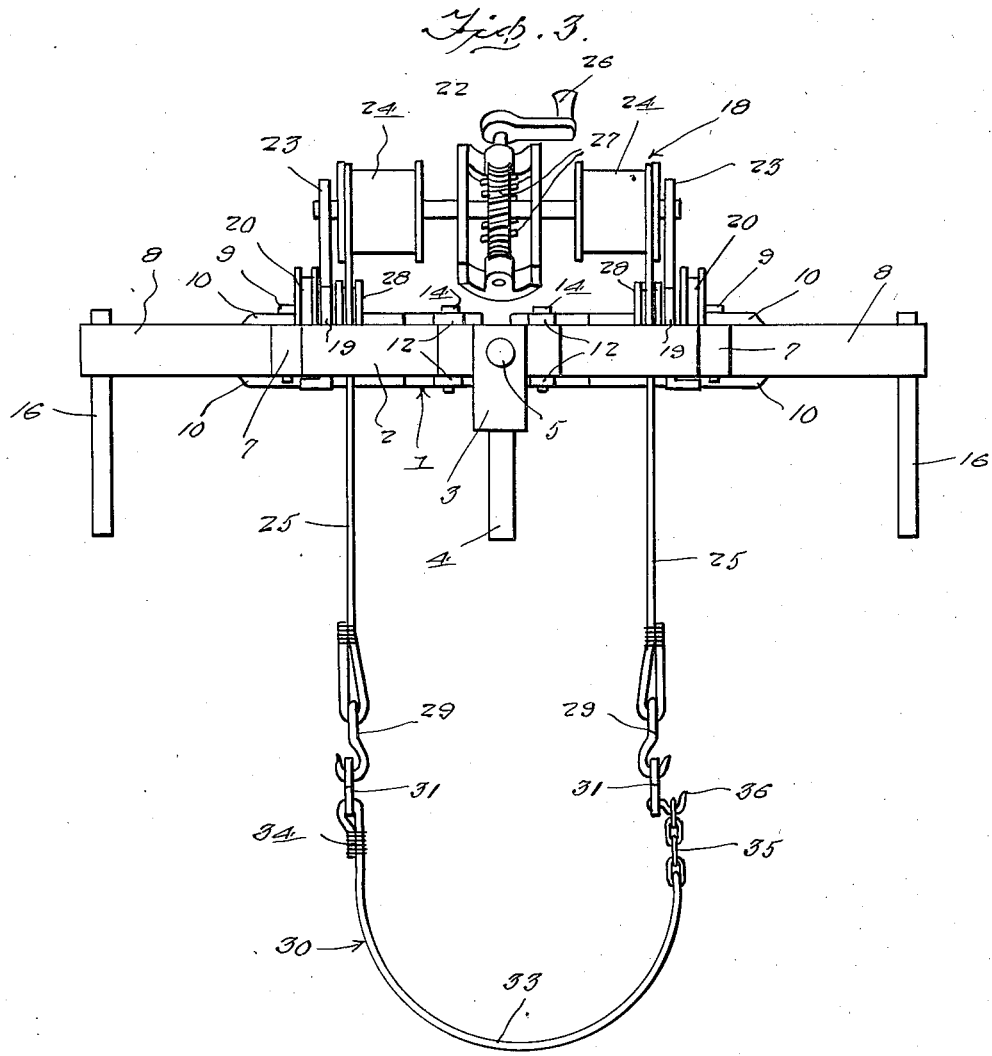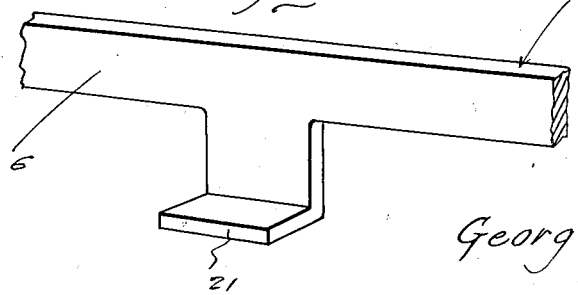

Patented Dec. 31, 1935

2,025,970

UNITED STATES PATENT OFFICE 2,025,970

TRANSMISSION HOIST

George Albert Burton, Tulsa, Okla.

Application September 24, 1934, Serial No. 745,362

1 Claim. (Cl. 248—163)

The present invention relates to new and useful improvements in hoists and has for its primary object to provide, in a manner as hereinafter set forth, a device of this character embodying a novel construction, combination and arrangement of parts through the medium of which automobile transmissions may be expeditiously removed and replaced without danger to the operator and without damaging the clutch or other portions of the vehicle.

Another important object of the invention is to provide a hoist of the character described embodying a construction which is such that a transmission may be removed and replaced without the necessity of removing the shifting lever or other parts.

Still another important object of the invention is to provide a transmission hoist which may be conveniently positioned for use in the automobile and removed therefrom.

Other objects of the invention are to provide a transmission hoist which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings, wherein like characters of reference designate corresponding parts throughout the several views, and wherein:—

Figure 1 is a view in top plan of a transmission hoist constructed in accordance with the present invention.

Figure 2 is a view in side elevation thereof.

Figure 3 is a view in front elevation of the hoist.

Figure 4 is a vertical sectional view, taken substantially on the line 4—4 of Figure 1.

Figure 5 is a detail view in perspective of one of the rear leg brackets.

Figure 6 is a detail view in perspective of one of the carriage retaining guides.

Referring now to the drawings in detail, it will be seen that the embodiment of the invention which has been illustrated comprises a substantially rectangular frame 1 of suitable material, preferably metal. Mounted at an inclination on the forward end 2 of the frame 1 is a sleeve 3 which slidably receives a front supporting leg 4 which is secured in adjusted position through the medium of a set screw 5.

On the rear ends of the side bars 6 of the frame 1 are eyes 7 in which brackets 8 are pivotally mounted, at an intermediate point, for swinging movement in a horizontal plane through the medium of pins 9 which are engageable in said eyes 7. As illustrated to advantage in Figure 5 of the drawings, the brackets 8 include opposed upper and lower flanges 10 which receive the eyes 7 therebetween, said flanges being provided with series of openings 11 which are adapted to be selectively aligned with the eyes 7 for the reception of the hinge pins 9. At their inner ends, the brackets 8 are provided with apertured ears 12 which straddle the rear end bar 13 of the frame 1 and in which pins 14 are removably mounted for retaining the brackets 8 in extended or operative position, as best seen in Figure 1. At their outer ends, the brackets 8 terminate in eyes 15 which receive slidably adjustable rear legs 16, said legs 16 being secured in adjusted position by set screws 17.

Mounted for longitudinal travel on the frame 1 is a carriage which is designated generally by the reference numeral 18, said carriage including side member 19 upon which grooved wheels 20 are journaled for travel on the side bars 6 of the frame 1. Angular guides 21 depend from the side members 19 for travel beneath the side bars 6 for preventing the carriage 18 from being lifted therefrom.

The carriage 18 further includes a shaft 22 which is journaled in inclined arms 23 which rise from the rear end portions of the side members 19. Fixed on the shaft 22 are drums 24 on which cables or chains 25 are windable. An actuating crank 26 is operatively connected to the shaft 22 by meshed worm gears 27.

The cables 25 are trained over pulleys 28 which are journaled on the inner sides of the members 19 and have secured to their free ends hooks 29 with which a sling designated generally by the reference numeral 30 is engaged.

The sling 30 comprises equalizing or evening bars 31 having openings 32 therein for the reception of the hooks 29. The reference numeral 33 designates sling cables which are permanently connected, at one end, to the end portions of one of the equalizing bars 31, as at 34, (see Figure 4). At their other ends, the cables 33 terminate in chains 35 which are detachably and adjustably connectible with hooks 36 on the end portions of the other equalizing bar 31. Of course, other suitable means may be employed for adjustably connecting one end of the cables 33.

It is thought that the manner of using the device will be apparent from a consideration of the foregoing, particularly to those skilled in the art to which the invention pertains. When placing the device in an automobile or removing it therefrom the brackets 8, with the rear legs 16 mounted thereon are swung to a position in parallelism with the side members 6 of the frame 1, the pins 14, of course, being removed to permit this. After the device has been passed into the automobile body, the brackets 8 are swung to open position and secured by the pins 14. When in position for use, the front leg 4 rests on the engine clutch and the rear legs 16 are engaged on any suitable support, such as in the bottom of the front seat, on the floor of the body or the sills of said body. The openings 11 in the brackets 8 permit the rear legs 16 to be conveniently adjusted as desired. The slings cables 33 are then adjusted beneath the transmission and the hoist is ready to function.

It is believed that the many advantages of a transmission hoist constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

A portable hoist frame comprising a substantially rectangular frame, a support leg adjustably mounted on one end of the frame, eyes on the other end of the frame, a pair of brackets, said brackets including opposed flanges extending above and below the eyes, said flanges having series of openings therein for selective alignment with the eyes, hinge pins engaged in the aligned openings for mounting the brackets on the frame for swinging movement in a horizontal plane, means on one end of each of the brackets for securing said brackets to the frame against swinging movement and in operative position, eyes on the other ends of the brackets, supporting legs adjustably mounted in the second-named eyes, and means for securing said legs in adjusted position.

GEORGE ALBERT BURTON.